United States Patent
Yuan et al.

(10) Patent No.: US 11,533,442 B2
(45) Date of Patent: Dec. 20, 2022

(54) METHOD FOR PROCESSING VIDEO WITH SPECIAL EFFECTS, STORAGE MEDIUM, AND TERMINAL DEVICE THEREOF

(71) Applicant: GUANGZHOU BAIGUOYUAN INFORMATION TECHNOLOGY CO., LTD., Guangzhou (CN)

(72) Inventors: Shaolong Yuan, Guangzhou (CN); Yutao Zhou, Guangzhou (CN)

(73) Assignee: GUANGZHOU BAIGUOYUAN INFORMATION TECHNOLOGY CO., LTD., Guangzhou (CN)

( * ) Notice: Subject to any disclaimer, the term of this patent is extended or adjusted under 35 U.S.C. 154(b) by 78 days.

(21) Appl. No.: 16/965,454

(22) PCT Filed: Dec. 24, 2018

(86) PCT No.: PCT/CN2018/123236
§ 371 (c)(1),
(2) Date: Jul. 28, 2020

(87) PCT Pub. No.: WO2019/149000
PCT Pub. Date: Aug. 8, 2019

(65) Prior Publication Data
US 2021/0058564 A1 Feb. 25, 2021

(30) Foreign Application Priority Data
Jan. 30, 2018 (CN) .......................... 201810089957.6

(51) Int. Cl.
*H04N 5/262* (2006.01)
*G11B 27/031* (2006.01)
*G06V 20/40* (2022.01)

(52) U.S. Cl.
CPC ............ *H04N 5/262* (2013.01); *G06V 20/46* (2022.01); *G11B 27/031* (2013.01)

(58) Field of Classification Search
CPC ............... H04N 5/262; H04N 21/4312; H04N 21/4318; G06K 9/00744; G11B 27/031; G06T 13/80; G06T 15/10; G06V 20/46
See application file for complete search history.

(56) References Cited

U.S. PATENT DOCUMENTS 7,626,617 B2 * 12/2009 Terada ................ H04N 5/2621
348/239
2003/0052909 A1 * 3/2003 Mo ...................... G11B 27/034
715/716
(Continued)

FOREIGN PATENT DOCUMENTS

CN  102779028 A  11/2012
CN  103389855 A  11/2013
(Continued)

OTHER PUBLICATIONS

Extended European search report of counterpart EP application No. 18903360.8 dated Feb. 18, 2021.
(Continued)

*Primary Examiner* — Michael E Teitelbaum
(74) *Attorney, Agent, or Firm* — Dilworth & Barrase, LLP.; Michael J. Musella, Esq.

(57) ABSTRACT

A method for processing interactive special effects for a video includes: acquiring a reference video containing a first special effect; acquiring a second special effect in interaction with the first special effect; and acquiring a video containing the second side effect by processing an image of the reference video according to the second special effect.

14 Claims, 1 Drawing Sheet

(56) References Cited

U.S. PATENT DOCUMENTS

| | | |
|---|---|---|
| 2003/0090506 A1 | 5/2003 | Moore et al. |
| 2010/0142913 A1 | 6/2010 | Hasegawa |
| 2015/0339010 A1* | 11/2015 | Pamuru .............. G06F 3/04842 715/726 |
| 2016/0173960 A1 | 6/2016 | Snibbe et al. |

FOREIGN PATENT DOCUMENTS

| | | |
|---|---|---|
| CN | 103905885 A | 7/2014 |
| CN | 104394331 A | 3/2015 |
| CN | 104618797 A | 5/2015 |
| CN | 104703043 A | 6/2015 |
| CN | 104780458 A | 7/2015 |
| CN | 104954848 A | 9/2015 |
| CN | 105491441 A | 4/2016 |
| CN | 105959725 A | 9/2016 |
| CN | 106385591 A | 2/2017 |
| CN | 107005658 A | 8/2017 |
| CN | 107168606 A | 9/2017 |
| CN | 107195310 A | 9/2017 |
| CN | 108234903 A | 6/2018 |
| RU | 2641236 C2 | 1/2018 |
| WO | 2016030879 A1 | 3/2016 |
| WO | 2016091172 A1 | 6/2016 |

OTHER PUBLICATIONS

International search report of PCT application No. PCT/CN2018/123236 dated Mar. 20, 2019.

First office action of Chinese application No. 201810089957.6 dated Jul. 2, 2019.

Notification to grant patent right for invention of Chinese application No. 201810089957.6 dated Mar. 25, 2020.

First office action of Russian application No. 2020128552 dated May 12, 2021.

* cited by examiner

METHOD FOR PROCESSING VIDEO WITH SPECIAL EFFECTS, STORAGE MEDIUM, AND TERMINAL DEVICE THEREOF

CROSS-REFERENCE TO RELATED APPLICATION

The present application is a national phase application based on PCT/CN2018/123236, filed on Dec. 24, 2018, which claims priority to Chinese Patent Application No. 201810089957.6, filed on Jan. 30, 2018 and entitled "Interactive special effect video processing method, medium and terminal equipment", which is incorporated herein by reference in its entirety.

TECHNICAL FIELD

The present disclosure relates to technical field of information processing, in particular, relates to a method for processing interactive special effects for a video, and a storage medium, and a terminal device thereof.

BACKGROUND

In the related art, video effects are generally synthesized by incorporating special effects obtained by post-processing into a video pre-captured by a user. For the video with a plurality of special effects, all the special effects are generally produced one by one.

SUMMARY

In view of the above, the present disclosure provides a method for processing interactive special effects for a video. The method includes: acquiring a reference video containing a first special effect; acquiring a second special effect in interaction with the first special effect; and acquiring a video containing the second special effect by processing an image of the reference video according to the second special effect.

The present disclosure further provides a computer-readable storage medium having a computer program stored therein, wherein the computer program, when run by a processor, enables the processor to perform following steps:

acquiring a reference video containing a first special effect;

acquiring a second special effect in interaction with the first special effect; and acquiring a video containing the second special effect by processing an image of the reference video according to the second special effect.

The present disclosure further provides a terminal device, including a memory, a processor, and a computer program stored in the memory and runnable on the processor, wherein the processor, when running the computer program, is enabled to perform following steps:

acquiring a reference video containing a first special effect;

acquiring a second special effect in interaction with the first special effect; and acquiring a video containing the second special effect by processing an image of the reference video according to the second special effect.

BRIEF DESCRIPTION OF THE DRAWINGS

The above and/or additional aspects and advantages of the present disclosure may become apparent and easily understood from the following description of the embodiments with reference to the accompanying drawings, in which.

DETAILED DESCRIPTION

Figure 1:
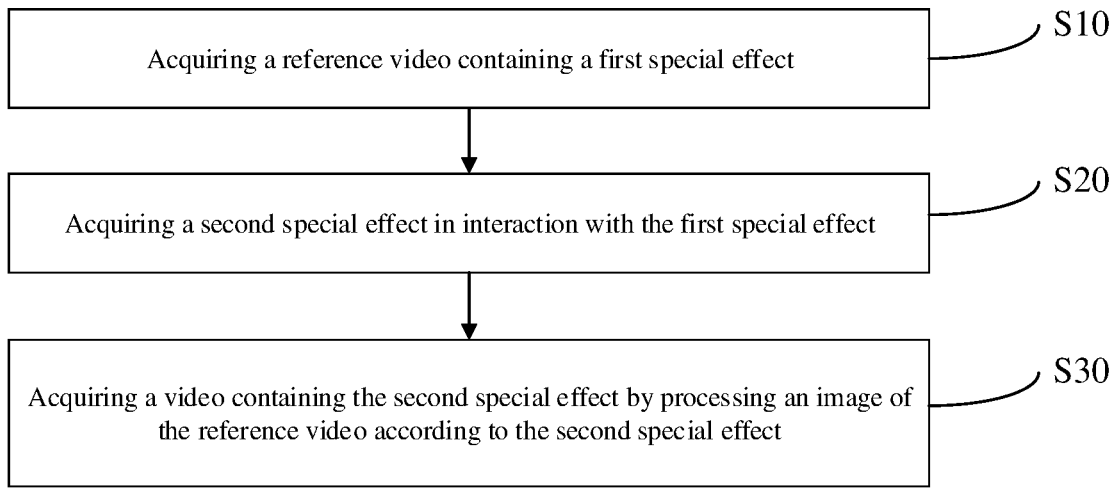
FIG. 1 is a schematic flowchart of a method for processing interactive special effects for a video according to an embodiment of the present disclosure.
Figure 2:
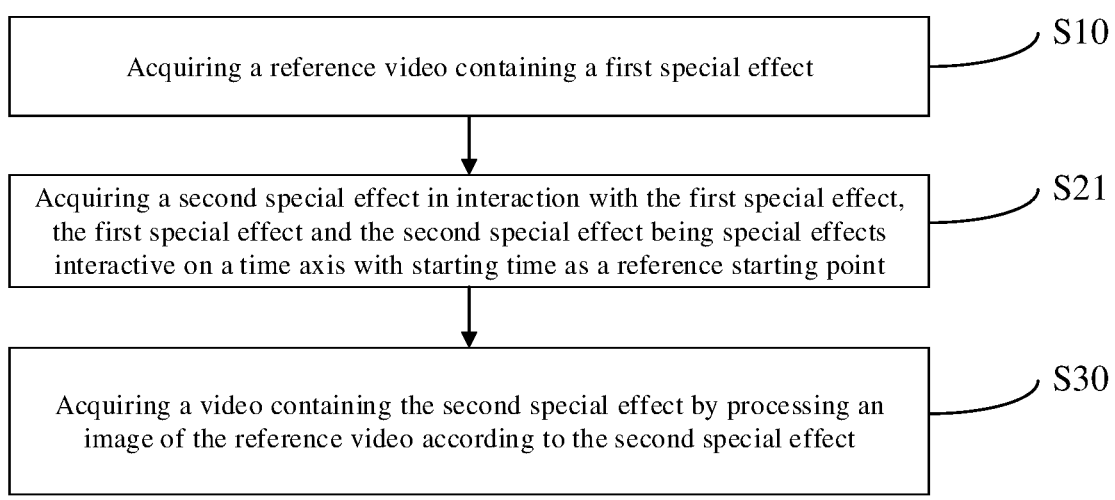
FIG. 2 is a schematic flowchart of a method for processing interactive special effects for a video according to another embodiment of the present disclosure.

Embodiments of the present disclosure are described in detail herein, examples of which are illustrated in the accompanying drawings. The reference numbers which are the same or similar throughout the accompanying drawings represent the same or similar elements or elements with the same or similar functions. The embodiments described below with reference to the accompanying drawings are illustrative for the purpose of explaining the present disclosure only and are not to be construed as limitations to the present disclosure.

In the related art, for the video with a plurality of special effects, all the special effects are generally produced one by one, this process of synthesizing the special effects is quite time-consuming Further, when the special effects are interactive to a certain extent, stricter requirements are imposed on the professionalism and the sophistication of user's operations, which makes it difficult for ordinary users to produce the video containing the special effects, particularly, a video containing interactive special effects, in video entertainment. As a result, more challenges are caused to the user when making such videos and video entertainments of the ordinary users are limited.

The present disclosure provides a method for processing interactive special effects for a video, and a storage medium, and a terminal device thereof, and has the following beneficial effects.

1. The second special effect may be acquired according to the first special effect of the reference video, so as to automatically generate the video containing the second special effect. In this way, the process of producing a plurality of special effects by a user is simplified, and the difficulty in making a plurality of special effects for the video is thereof reduced. Moreover, a plurality of interactive effects are present between the second special effect and the first special effect, which increases the enjoyment of the user in making the special effects for the video.

2. The first content information and/or the second content information may be carried in the reference video, so as to facilitate separately editing the first special effect and/or the second special effect, which avoids editing the entire reference video, thereby reducing the occupation of the memory space of the terminal. Besides, the replacement of the first special effect and/or the second special effect also becomes simpler.

3. The special-effect group corresponding to the first special effect may be determined by the correspondence table of the interactive special effects, and the second special effect may be determined according to user selection or system settings or special-effect scores, such that the first special effect and the second special effect can be combined in more ways, thereby enriching the interactive effects among the special effects. In addition, the entertainment of the special effects for the video can be further enhanced by time of interaction between the first special effect and the second special effect.

The present disclosure provides a method for processing interactive special effects for a video. As shown in an embodiment of FIG. 1, the method includes the following steps:

In step S10, a reference video containing a first special effect is acquired.

In step S20, a second special effect in interaction with the first special effect is acquired.

In step S30, a video containing the second special effect is acquired by processing an image of the reference video according to the second special effect.

Each step is described in detail as below.

In step S10, the reference video containing the first special effect is acquired.

The reference video may be a video recorded immediately or a video that has been pre-stored in a terminal. The first special effect contained in the reference video may be a visual special effect or a sound special effect. When the first special effect is the visual special effect, the first special effect may be displayed in the image of the reference video, or instead, the first special effect may be only stored in a file relevant to the reference video. Meanwhile, the first special effect and the reference video may belong to the same video stream file, or instead, they belong to different files and are only synthesized and output into the image or sound of the same video according to corresponding information or matching information during playback. The first special effect may be an effect associated with a limb motion in the video picture. For example, when the limb motion of finger-snapping appears in the video picture, the limb motion is matched with the first special effect for switching user scenarios. The special effect for switching user scenarios may be displayed in the video picture of the reference video, or instead, the first special effect may be hidden according to user needs and displayed only when another motion for triggering the display of the special effect occurs.

In step S20, the second special effect in interaction with the first special effect is acquired.

The second special effect may be a visual special effect or a sound special effect. The second special effect being in interaction with the first special effect means that the first special effect and the second special effect have some special correlative effects. For example, when the first special effect is a sparkle effect appearing in the video picture, the second special effect of snowflakes appears in the video picture simultaneously or in a delayed manner; when the first special effect is a gateway appearing on the left side of a character in the video picture, the second special effect of another gateway may appear on the right side of the character in the video picture simultaneously or in a delayed manner; and when the first special effect is an explosive visual special effect appearing in the video picture, the second special effect of an explosive sound effect is output in the video simultaneously or in a delayed manner The second special effect may be acquired from the terminal or the special-effect server.

In step S30, an image of the reference video is processed according to the second special effect, to obtain a video containing the second special effect.

The image of the reference video may be processed in the following ways. For example, the first special effect and the second special effect are outputted to the image or sound of the reference video simultaneously, or, the first special effect and the second special effect are displayed sequentially in the image of the reference video according to certain time, or, the first special effect and the second special effect are displayed in the reference video according to a certain interactive motion track, or, a certain triggering logic for the first special effect and the second special effect is preset to facilitate subsequent interactive output, etc. When at least one of the first special effect and the second special effect is the visual special effect, a video containing the visual special effect may be formed; and when both of the first special effect and the second special effect are sound special effects, the image of the reference video may be processed according to sound of the second special effect to form a video containing the sound special effect.

In the present embodiment, the second special effect may be acquired according to the first special effect of the reference video, so as to automatically generate a video containing the second special effect. In this way, the process of producing a plurality of special effects by a user is simplified, and the difficulty in creating the plurality of special effects for the video is thereof reduced. Moreover, a plurality of interactive effects are present between the second special effect and the first special effect, which increases the enjoyment of the user in making the special effects for the video.

Based on the above embodiment, the present disclosure further provides another embodiment. The reference video carries first content information of the first special effect;

the acquiring the second special effect in interaction with the first special effect includes:

acquiring the first special effect from the first content information; and acquiring the second special effect in interaction with the first special effect from a correspondence table of interactive special effects.

In the present embodiment, the first content information may include a display effect or a sound effect of the first special effect, or may include a native address or a network address for acquiring the first special effect. In addition, the first content information may also include a producer and duration of the first special effect, as well as a reference video decoding method, etc. The first special effect may be acquired from the first content information directly or be acquired according to the native address or the network address of the first special effect. Before the acquisition of the second special effect, the correspondence table of the interactive special effects may be pre-set, so as to determine the second special effect according to the first special effect. In the present embodiment, the first special effect may be included in the first content information to avoid directly synthesizing the first special effect into the reference video, which will facilitate modifying the first special effect. For example, when the first special effect is the visual special effect, the first special effect may be read from the first content information, instead of being directly displayed in the image of the reference video, so that the first special effect in the first content information may be modified or edited separately, thereby achieving the purpose of modifying the first special effect in the reference video without editing the reference video. In this way, the memory space occupied during editing of the special effect is reduced, and modification time or replacement time for the first special effect is also saved.

The present disclosure provides yet another embodiment. The reference video carries second content information of the second special effect in interaction with the first special effect;

the acquiring the second special effect in interaction with the first special effect includes:

acquiring the second special effect in interaction with the first special effect from the second content information.

In the present embodiment, the second content information carries both relevant information of the first special effect and relevant information of the second special effect. The second content information may include the display effect or the sound effect of the second special effect, or the native address or the network address for acquiring the second special effect, or the correspondence table of the interactive special effects which shows a corresponding relationship between the first special effect and the second special effect. Besides, the second content information may further include a producer and duration of the second special effect, and the like. The second special effect may be acquired from the second content information directly or be acquired according to the native address or the network address. In the present embodiment, the second content information of the second special effect may be carried in the reference video, and the second special effect, instead of being modified in the reference video, may be modified by modifying or replacing the second content information. Thus, the modification of the second special effect is simplified.

Based on the above embodiment, the present disclosure provides still yet another embodiment. The acquiring the second special effect in interaction with the first special effect includes:

identifying a feature of the first special effect in the reference video; and acquiring, according to the feature, the second special effect in interaction with the first special effect from a correspondence table of interactive special effects.

In the present embodiment, when the first special effect and the reference video belong to the same video stream file, the feature of the first special effect may be identified from the reference video, so as to acquire the second special effect according to the correspondence table of the interactive special effects. The correspondence table of the interactive special effects may be pre-stored in the special-effect server or the terminal to determine the corresponding relationship between the first special effect and the second special effect. When the second special effect corresponding to the first special effect needs to be modified, instead of being modified in the reference video, it may be directly modified in the correspondence table of the interactive special effects. In this way, the modification is simplified.

When the first special effect and the reference video belong to the separate files, the reference video may also carry the first content information, or information that has a correspondence relationship between the first special effect and the reference video, so as to identify the feature of the first special effect. The feature of the first special effect may be included in the reference video, or may be contained in the corresponding native address or network address. After the feature of the first special effect is identified, the second special effect in interaction with the first special effect may be acquired from the correspondence table of the interactive special effects according to the feature. The second special effect may be included in the reference video, or may also be contained in the corresponding native address or network address. When the second special effect is included in the reference video, the second special effect may not be displayed or output temporarily, instead, a special-effect picture or a special-effect audio may be output after an instruction that triggers display or output is acquired. When the second special effect is included in the reference video, time spent in acquiring the second special effect may be saved, and an abnormal time delay or failure in acquisition of the second special effect may be avoided.

Based on the above embodiment, the present disclosure further provides still yet another embodiment:

acquiring the reference video containing the first special effect and acquiring the second special effect in interaction with the first special effect include:

determining whether the reference video carries second content information of the second special effect in interaction with the first special effect;

if the reference video carries the second content information of the second special effect, acquiring the second special effect in interaction with the first special effect from the second content information;

if the reference video does not carry the second content information of the second special effect, determining whether the reference video carries first content information of the first special effect;

if the reference video carries the first content information of the first special effect, acquiring the first special effect from the first content information, and acquiring the second special effect in interaction with the first special effect from a correspondence table of interactive special effects; and if the reference video does not carry the first content information of the first special effect, identifying a feature of the first special effect in the reference video, and acquiring, according to the feature, the second special effect in interaction with the first special effect from the correspondence table of the interactive special effects.

In the present embodiment, the second special effect may be directly and preferably acquired from the second content information to speed up the acquisition of the second special effect. If no second content information is available for the second special effect, the second special effect corresponding to the first special effect is acquired from the correspondence table of the interactive special effects after the first special effect is acquired from the first content information for the first special effect. If no first content information is available for the first special effect, the second special effect is acquired according to the feature of the first special effect after the feature is identified from the reference video. In the present embodiment, the second special effect may be acquired in various ways, and the fastest acquisition method is used as the first order acquisition method, so as to accelerate the acquisition of the second special effect. Meanwhile, other acquisition methods are used as alternative ways to ensure acquisition of the second special effect.

Based on the above embodiment, the present disclosure provides yet another embodiment. Acquiring the second special effect in interaction with the first special effect from the correspondence table of the interactive special effects includes:

acquiring a special-effect group in interaction with the first special effect from a correspondence table of interactive special effects of a terminal or a special-effect server, wherein the special-effect group includes two or more second special effects, each of the second special effects has a color attribute and a special-effect score;

acquiring the second special effect corresponding to the second special-effect selection instruction from the special-effect group in response to a case that a second special-effect selection instruction is received; and calculating a color average value of a current-frame picture of the reference video and acquiring the second special effect of which the color attribute corresponds to the color average value in response to a case that the second special-effect selection instruction is not received and the special-effect color self-adaptation is set, and acquiring the second special effect having the highest special-effect score in response to a case that the second special-effect selection instruction is not received and the special-effect color self-adaptation is not set.

The embodiment provides a specific implementation based on the color effect. For example, the first special effect is sound, and the second special effect in interaction with the first special effect is a fruit visual effect of different colors. When the first special effect triggers the second special effect, the user may choose a special effect for inputting from the special-effect group which has the fruit visual effect of different colors. If the user does not choose, an automatic choice may be made according to the color average value of the current-frame picture of the reference video, or according to the special-effect score. According to the color effect interaction method in this embodiment, the second special effect may be determined by the user, so as to improve the user's participation and increase creative forms of the second special effect. Moreover, the function of automatically adding the second special effect is also provided, which may simplify the user's operation and improve the user experience.

The second special effect in the special-effect group may be provided to the user by a third-party server, and the user may score each second special effect in the special-effect group, so as to improve the user's interaction.

In the present disclosure, the first special effect and the second special effect may be special effects having the same, contrary, or similar contents. For example, the same contents mean that the special effects have the same image, sound, or movement. For example, when the first special effect is to add a blushing special effect to a character A, the second special effect is to add the same blushing special effect to a character B. The contrary contents may include a mirror image of the action of the picture or contrary change of the picture. For example, when the first special effect is to zoom in the character A, the second special effect is to zoom out the character B. The similar contents may include the addition of similar special effects. For example, when the first special effect is to add a dizzying special effect on top of the character A, the second special effect is to add another different dizzying special effect on the top of the character B. In the present disclosure, various special effects such as exaggeration, comparison, contrast, etc. may be formed by different combinations of the first special effect and the second special effect, thereby providing the user with much richer ways of entertainment.

The present disclosure further provides another embodiment: the first special effect and the second special effect may also be special effects interactive on a time axis with starting time as a reference starting point. In this present embodiment, step S20 in the above embodiment may include followings.

In step S21, a second special effect in interaction with the first special effect is acquired, and the first special effect and the second special effect are special effects interactive on the time axis with starting time as the reference starting point.

Interaction time or triggering time of the first special effect and the second special effect may take the time axis as a reference object. The special effects of displaying the image and playing the sound may be triggered simultaneously, or one of the special effects is delayed, or the special effects are conducted on the time axis in an alternating manner.

Based on the above embodiment, the present disclosure further provides the following embodiment. The first special effect and the second special effect comprising the special effects interactive on the time axis with the starting time as the reference starting point includes that on the time axis with the starting time as the reference starting point, the first special effect and the second special effect interact at the same time point; and processing the image of the reference video according to the second special effect includes:

acquiring a first time point of the first special effect in the reference video on the time axis with starting time as the reference starting point; and processing an image, corresponding to the first time point, of the reference video by using the second special effect.

In the present embodiment, the first special effect and the second special effect interact at the same time point. For example, the first special effect and the second special effect are both flame special effects which are simultaneously displayed in different positions of the video image after 5 seconds of the starting time; or the first special effect that is the flame visual special effect and the second special effect that is a flame sound special effect may appear at the same time after 5 seconds of the starting time, so as to enhance the combustion special effect.

Based on the above embodiment, the present disclosure further provides the following embodiment. The first special effect and the second special effect comprising the special effects interactive on the time axis with the starting time as the reference starting point include, on the time axis with the starting time as the reference starting point, the first special effect and the second special effect interact at time points in a sequential relationship; and processing the image of the reference video according to the second special effect includes:

acquiring a first time point of the first special effect in the reference video on the time axis with starting time as the reference starting point;

acquiring, according to the sequential relationship, a second time point of the second special effect in the reference video; and processing an image, corresponding to the second time point, of the reference video by using the second special effect.

In the present embodiment, the interaction time points of the first special effect and the second special effect are staggered. For example, if the first special effect is rainy, and the second special effect is umbrella opening, the appearance of the second special effect may be delayed according to the acquired first time point of the first special effect in the reference video, so as to reflect a logical relationship between the two special effects. Alternatively, more diverse entertainment effects may be achieved based on the time difference (sequential relationship) between the two special effects.

Based on the above embodiments, after acquiring the video containing the second special effect, the method further includes:

synthesizing the video containing the second special effect and the reference video into one video.

The video containing the second special effect may or may not include the first special effect. In order to enhance the entertainment effect, the video containing the second special effect and the reference video containing the first special effect may be synthesized into one video, so as to form two video pictures having a contrast effect in the one video. For example, if the reference video shows that the user lays eyes on delicious food, the first special effect shows the exaggerated chow-down expression of the user who lays eyes on the delicious food, and the second special effect shows the exaggerated cold refusal expression of the user who lays eyes on the delicious food. A first video (the reference video) showing the exaggerated chow-down expression of the user who lays eyes on the delicious food and a second video (the video containing the second special effect) showing the exaggerated cold refusal expression of the user who lays eyes on the delicious food may be synthesized into one video, so as to achieve the contrast effect.

There are many synthesis methods. For example, the first video and the second video that are synthesized into one video may be set left and right or up and down, or may be set that one of the videos is played first, and the other video is played after finishing the first play. The first video and the second video may be played at an interval of preset time or played at an interval of a preset distance. In this way, the user can achieve more diverse combination effects by various combination forms, thereby providing the user with much richer ways of entertainment.

The present disclosure further provides a computer-readable storage medium storing a computer program therein. The computer program, when run by a processor, enables the processor to perform the method for processing interactive special effects for a video as defined in any one of the embodiments.

The present disclosure further provides a terminal device, including a memory, a processor, and a computer program stored in the memory and runnable on the processor. The processor, when running the computer program, is enabled to perform the method for processing interactive special effects for a video as defined in any one of the embodiments.

The terminal device may be a device by which video programs can be watched, such as a mobile phone, a tablet computer, a notebook computer, a desktop computer, or the like. The operating mode of the terminal device according to the present disclosure will be described below by taking a mobile phone as an example.

In the present embodiment, the processor included in the terminal device also has the following functions:

acquiring a reference video containing a first special effect;

acquiring a second special effect in interaction with the first special effect; and acquiring a video containing the second special effect by processing an image of the reference video according to the second special effect.

In addition, each of modules in the embodiments of the present disclosure may be integrated into one processing module. Optionally, each of the units exists physically and independently. Optionally, two or more of the units may be integrated into one module. The above integrated modules may be implemented in the form of hardware or software functional modules. The integrated modules, if implemented in the form of the software functional modules and sold or used as a standalone product, may be stored in a computer-readable storage medium.

The storage medium may be a read-only memory (ROM), a magnetic disk, an optical disk, or the like.

Described above only some embodiments of the present disclosure, and it should be noted that those skilled in the art may also derive several improvements and modifications without departing from the principles of the present disclosure which should be considered as the scope of protection of the present disclosure.

What is claimed is:

1. A method for processing a video with special effects, comprising:

acquiring a reference video containing a first special effect, wherein the reference video carries first content information of the first special effect;

acquiring the first special effect from the first content information;

acquiring a second special effect from a correspondence table of interactive special effects according to the first special effect, wherein the first special effect and the second special effect interact to form an interactive special effect; and acquiring a video containing the second special effect by processing an image of the reference video according to the second special effect;

wherein acquiring the second special effect from the correspondence table of the interactive special effects comprises:

acquiring a special-effect group in interaction with the first special effect from the correspondence table of the interactive special effects of a terminal or a special-effect server, wherein the special-effect group comprises two or more second special effects, each of the second special effects comprising a color attribute and a special-effect score;

acquiring the second special effect corresponding to a second special-effect selection instruction from the special-effect group in response to receiving the second special-effect selection instruction; and calculating a color average value of a current-frame picture of the reference video and acquiring the second special effect of the color attribute corresponding to the color average value in response to a case that the second special-effect selection instruction is not received and the special-effect color self-adaptation is set, or acquiring the second special effect with a highest special-effect score in response to a case that the second special-effect selection instruction is not received and the special-effect color self-adaptation is not set.

2. A method for processing a video with special effects, comprising:

acquiring a reference video containing a first special effect, wherein the reference video carries second content information of a second special effect;

acquiring the second special effect from a correspondence table of interactive special effects according to the second content information, wherein the first special effect and the second special effect interact to form an interactive special effect; and acquiring a video containing the second special effect by processing an image of the reference video according to the second special effect;

wherein acquiring the second special effect from the correspondence table of the interactive special effects comprises:

acquiring a special-effect group in interaction with the first special effect from the correspondence table of the interactive special effects of a terminal or a special-effect server, wherein the special-effect group comprises two or more second special effects, each of the second special effects comprising a color attribute and a special-effect score;

acquiring the second special effect corresponding to a second special-effect selection instruction from the special-effect group in response to receiving the second special-effect selection instruction; and calculating a color average value of a current-frame picture of the reference video and acquiring the second special effect of the color attribute corresponding to the color average value in response to a case that the second special-effect selection instruction is not received and the special-effect color self-adaptation is set, or acquiring the second special effect with a highest special-effect score in response to a case that the second special-effect selection instruction is not received and the special-effect color self-adaptation is not set.

3. A method for processing a video with special effects, comprising:

acquiring a reference video containing a first special effect;

identifying a feature of the first special effect in the reference video;

acquiring, according to the feature, a second special effect from a correspondence table of interactive special effects, wherein the first special effect and the second special effect interact to form an interactive special effect; and acquiring a video containing the second special effect by processing an image of the reference video according to the second special effect;

wherein acquiring the second special effect from the correspondence table of the interactive special effects comprises:

acquiring a special-effect group in interaction with the first special effect from the correspondence table of the interactive special effects of a terminal or a special-effect server, wherein the special-effect group comprises two or more second special effects, each of the second special effects comprising a color attribute and a special-effect score;

acquiring the second special effect corresponding to a second special-effect selection instruction from the special-effect group in response to receiving the second special-effect selection instruction; and calculating a color average value of a current-frame picture of the reference video and acquiring the second special effect of the color attribute corresponding to the color average value in response to a case that the second special-effect selection instruction is not received and the special-effect color self-adaptation is set, or acquiring the second special effect with a highest special-effect score in response to a case that the second special-effect selection instruction is not received and the special-effect color self-adaptation is not set.

4. The method according to claim 1, wherein the first special effect and the second special effect are special effects having the same, contrary, or similar contents.

5. The method according to claim 1, wherein the first special effect and the second special effect comprise special effects interactive on a time axis with starting time as a reference starting point.

6. The method according to claim 5, wherein the first special effect and the second special effect comprising the special effects interactive on the time axis with the starting time as the reference starting point comprises: on the time axis with the starting time as the reference starting point, the first special effect and the second special effect interact at the same time point; and processing the image of the reference video according to the second special effect comprises:

acquiring a first time point of the first special effect in the reference video on the time axis with starting time as the reference starting point; and processing an image, corresponding to the first time point, of the reference video by using the second special effect.

7. The method according to claim 5, wherein the first special effect and the second special effect comprising the special effects interactive on the time axis with the starting time as the reference starting point comprises: on the time axis with the starting time as the reference starting point, the first special effect and the second special effect interact at time points in a sequential relationship; and processing the image of the reference video according to the second special effect comprises:

acquiring a first time point of the first special effect in the reference video on the time axis with starting time as the reference starting point;

acquiring, according to the sequential relationship, a second time point of the second special effect in the reference video; and processing an image, corresponding to the second time point, of the reference video by using the second special effect.

8. The method according to claim 1, after acquiring the video containing the second special effect, further comprising:

synthesizing the video containing the second special effect and the reference video into one video.

9. A non-transitory computer-readable storage medium having a computer program stored therein, wherein the computer program, when run by a processor, enables the processor to perform the method for processing the video with special effects as defined in claim 1.

10. A terminal device, comprising a memory, a processor, and a computer program stored in the memory and runnable on the processor, wherein the processor, when running the computer program, is enabled to perform the method for processing the video with special effects as defined in claim 1.

11. The terminal device according to 10, wherein the first special effect and the second special effect are special effects having the same, contrary, or similar contents.

12. The terminal device according to 10, wherein the first special effect and the second special effect comprise special effects interactive on a time axis with starting time as a reference starting point.

13. A terminal device, comprising a memory, a processor, and a computer program stored in the memory and runnable on the processor, wherein the processor, when running the computer program, is enabled to perform the method for processing the video with special effects as defined in claim 2.

14. A terminal device, comprising a memory, a processor, and a computer program stored in the memory and runnable on the processor, wherein the processor, when running the computer program, is enabled to perform the method for processing the video with special effects as defined in claim 3.

* * * * *

UNITED STATES PATENT AND TRADEMARK OFFICE
CERTIFICATE OF CORRECTION

| | |
|---|---|
| PATENT NO. | : 11,533,442 B2 |
| APPLICATION NO. | : 16/965454 |
| DATED | : December 20, 2022 |
| INVENTOR(S) | : Shaolong Yuan |

It is certified that error appears in the above-identified patent and that said Letters Patent is hereby corrected as shown below:

On the Title Page

(73) Assignee should read: BIGO TECHNOLOGY PTE. LTD., MAPLETREE BUSINESS CITY, (SG)

Signed and Sealed this
Twenty-fifth Day of April, 2023

Katherine Kelly Vidal
*Director of the United States Patent and Trademark Office*